US009239797B2

(12) United States Patent
Galbraith et al.

(10) Patent No.: US 9,239,797 B2
(45) Date of Patent: Jan. 19, 2016

(54) IMPLEMENTING ENHANCED DATA CACHING AND TAKEOVER OF NON-OWNED STORAGE DEVICES IN DUAL STORAGE DEVICE CONTROLLER CONFIGURATION WITH DATA IN WRITE CACHE

(71) Applicant: GLOBALFOUNDRIES Inc., Grand Cayman (KY)

(72) Inventors: Robert E. Galbraith, Rochester, MN (US); Dennis C. Mairet, Rochester, MN (US); William J. Maitland, Jr., Lenoxville, PA (US); Stephen M. Tee, Marble Falls, TX (US); Rick A. Weckwerth, Oronoco, MN (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 156 days.

(21) Appl. No.: 13/967,633

(22) Filed: Aug. 15, 2013

(65) Prior Publication Data

US 2015/0052385 A1  Feb. 19, 2015

(51) Int. Cl.
*G06F 11/20* (2006.01)
*G06F 12/08* (2006.01)

(52) U.S. Cl.
CPC ........ *G06F 12/0891* (2013.01); *G06F 11/2028* (2013.01); *G06F 11/2092* (2013.01); *G06F 11/2097* (2013.01); *G06F 12/0888* (2013.01); *G06F 11/2025* (2013.01); *G06F 11/2056* (2013.01)

(58) Field of Classification Search
CPC ............ G06F 12/0888; G06F 12/0891; G06F 11/2028; G06F 11/2023; G06F 11/2025; G06F 11/2043; G06F 11/2046; G06F 11/2056; G06F 11/2066; G06F 11/3037; G06F 12/0866–12/0873
See application file for complete search history.

(56) References Cited

U.S. PATENT DOCUMENTS

| | | | | |
|---|---|---|---|---|
| 5,623,625 A * | 4/1997 | Thompson | .......... | G06F 11/1435 711/113 |
| 5,761,705 A * | 6/1998 | DeKoning | .......... | G06F 11/1666 711/113 |
| 5,928,367 A * | 7/1999 | Nelson | ................ | G06F 11/1666 714/6.3 |
| 6,189,079 B1 * | 2/2001 | Micka | ................. | G06F 11/2071 711/161 |
| 6,230,240 B1 * | 5/2001 | Shrader | ................ | G06F 3/0607 710/302 |
| 6,295,577 B1 * | 9/2001 | Anderson | ........... | G06F 11/1441 711/111 |
| 6,338,110 B1 * | 1/2002 | van Cruyningen | ..... | G06F 3/061 710/109 |
| 6,513,097 B1 * | 1/2003 | Beardsley | ........... | G06F 11/0724 711/113 |
| 6,571,324 B1 * | 5/2003 | Elkington | .............. | G11C 29/74 711/120 |

(Continued)

*Primary Examiner* — Jared Rutz
*Assistant Examiner* — Khoa D Doan
(74) *Attorney, Agent, or Firm* — Heslin Rothenberg Farley & Mesiti P.C.

(57) ABSTRACT

A method, system and computer program product are provided for implementing enhanced data caching and takeover of non-owned storage devices in a computer system. Each of a first controller and a second controller has a cache memory. During normal run-time, each storage device controller validates cached write data after it is written to its cache memory by reading the write data from its cache memory. If any error is detected on the read, then unit check failed storage device controller, which results in a reset of the failed storage device controller. When a storage device controller detects its dual partner controller fails, the surviving storage device controller queues host read/write operations for its storage devices already owned, and tests a cache mirrored copy from its cache memory of the failed first storage device controller before takeover of the failed controller's storage devices.

20 Claims, 6 Drawing Sheets

(56) References Cited

U.S. PATENT DOCUMENTS

| | | | | |
|---|---|---|---|---|
| 6,574,709 B1* | 6/2003 | Skazinski | G06F 11/2092 | 711/119 |
| 6,681,339 B2 | 1/2004 | McKean et al. | | |
| 6,732,289 B1* | 5/2004 | Talagala | G06F 11/2092 | 714/6.3 |
| 6,941,396 B1* | 9/2005 | Thorpe | G06F 3/0613 | 707/999.202 |
| 7,028,147 B2* | 4/2006 | Wu | G06F 11/2097 | 711/150 |
| 7,444,541 B2 | 10/2008 | Lubbers et al. | | |
| 7,475,169 B2* | 1/2009 | Yuhara | G06F 12/0871 | 710/15 |
| 7,613,947 B1* | 11/2009 | Coatney | G06F 11/0727 | 714/6.1 |
| 7,849,350 B2* | 12/2010 | French | G06F 11/2089 | 714/3 |
| 7,958,391 B2* | 6/2011 | Takada | G06F 11/0727 | 714/6.2 |
| 8,065,479 B2* | 11/2011 | Humlicek | G06F 12/0804 | 711/113 |
| 8,782,344 B2* | 7/2014 | Talagala | G06F 12/0888 | 711/100 |
| 2002/0133735 A1* | 9/2002 | McKean | G06F 11/2092 | 714/5.11 |
| 2004/0153727 A1* | 8/2004 | Hicken | G06F 11/1658 | 714/6.12 |
| 2005/0228941 A1* | 10/2005 | Abe | G06F 11/1435 | 711/113 |
| 2006/0004973 A1* | 1/2006 | Sardella | G06F 11/1666 | 711/162 |
| 2006/0010341 A1* | 1/2006 | Kodama | G06F 3/0605 | 714/6.31 |
| 2006/0075186 A1* | 4/2006 | Abe | G06F 11/1032 | 711/113 |
| 2006/0248308 A1* | 11/2006 | Wang | G06F 11/2089 | 711/173 |
| 2007/0002482 A1* | 1/2007 | Daikokuya | G06F 3/0619 | 360/53 |
| 2007/0294477 A1* | 12/2007 | Yanagawa | G06F 11/2069 | 711/114 |
| 2008/0005614 A1* | 1/2008 | Lubbers | G06F 11/2092 | 714/11 |
| 2008/0005616 A1* | 1/2008 | Barlow | G06F 11/0775 | 714/30 |
| 2008/0126885 A1* | 5/2008 | Tangvald | G06F 11/1076 | 714/54 |
| 2008/0177954 A1* | 7/2008 | Lee | G06F 12/126 | 711/154 |
| 2008/0235454 A1* | 9/2008 | Duron | G06F 11/1064 | 711/128 |
| 2010/0169574 A1* | 7/2010 | Yamasaki | G06F 1/3221 | 711/114 |
| 2010/0185897 A1* | 7/2010 | Abts | G06F 11/106 | 714/16 |
| 2011/0231602 A1* | 9/2011 | Woods | G06F 13/16 | 711/112 |
| 2012/0054435 A1* | 3/2012 | Arnold | G06F 9/30018 | 711/118 |
| 2012/0102268 A1* | 4/2012 | Smith | G06F 11/2089 | 711/113 |
| 2012/0304001 A1* | 11/2012 | Bakke | G06F 3/061 | 714/6.24 |
| 2014/0359223 A1* | 12/2014 | Yu | G06F 11/1064 | 711/128 |

* cited by examiner

IMPLEMENTING ENHANCED DATA CACHING AND TAKEOVER OF NON-OWNED STORAGE DEVICES IN DUAL STORAGE DEVICE CONTROLLER CONFIGURATION WITH DATA IN WRITE CACHE

FIELD OF THE INVENTION

The present invention relates generally to the data processing field, and more particularly, relates to a method, system and computer program product for implementing enhanced data caching and takeover of non-owned storage devices in dual storage device controller configuration with data in write cache.

DESCRIPTION OF THE RELATED ART

A feature of some storage device controllers is write caching. When the host system writes data to a storage device, the data is stored on the controller in memory which can be retained in the event of power loss to the controller. Good status is given to the host for the write operation. If the host writes the same data again or reads it, then the second operation can be serviced from the write cache. At some later time, the data is written to the storage device. This write cache feature gives two performance benefits. It improves response time for write operations and also for any read operations which can be serviced from memory instead of going to the device. Write caching also reduces the number of operations which must be issued to the storage devices.

Storage device controllers may store the data redundantly on attached storage devices so that any single device failure does not lose data. This leaves a write caching controller in the situation of having a single copy of some data in its cache memory. A controller failure could result in lost data. One solution is to have a second controller connected to the same storage devices. The two controllers are also connected to each other. The two controllers keep mirrored copies of the cache data. If one controller fails, the other controller can continue with the host's read/write workload.

When dual controllers are used, a performance optimization is to assign some storage devices to one controller and other storage devices to the other controller. This allows use of both controllers' bandwidth in reading and writing data to the storage devices.

One way to transfer ownership of data from one controller to the other controller in the event of a controller failure is to reset both controllers. If both controllers come back from the reset, then continue as before. If the failing controller does not come back from the reset because it is truly broken, then the surviving controller takes ownership of all data and storage devices. The surviving controller continues servicing host read/write operations.

An improvement on this method for transferring ownership of data is for the surviving controller to take ownership of all data and storage devices immediately when it sees its partner controller go away. This shortens the time access to the failing controller's data is unavailable to the host system.

Regardless of whether both controllers are reset or just the failed one, the surviving controller must update the metadata on all storage devices. The surviving controller must make sure the failed controller will see its cache is out of synchronization when and if it comes back from its reset. The failed controller will discard its out of date cache data and re-minor its cache with the surviving controller.

It would be unfortunate, however, to take ownership of the other controller's data, update the metadata, and start servicing host operations if the mirrored copy of cache data on the surviving controller is not intact. This is unfortunate, because many times the failing controller will come back after a reset and have its cache data intact. That does no good; however, if the metadata has been updated indicating the failed controller's cache is out of synchronization.

A need exists for an effective mechanism to enable implementing enhanced data caching and takeover of non-owned storage devices in dual storage device controller configuration with data in write cache.

SUMMARY OF THE INVENTION

Principal aspects of the present invention are to provide a method, system and computer program product for implementing enhanced data caching and takeover of non-owned storage devices in dual storage device controller configuration with data in write cache. Other important aspects of the present invention are to provide such method, system and computer program product substantially without negative effects and that overcome many of the disadvantages of prior art arrangements.

In brief, a method, system and computer program product are provided for implementing enhanced data caching and takeover of non-owned storage devices in a computer system. Each of a first storage device controller and a second storage device controller has a cache memory. A plurality of storage devices is connected to the first storage device controller and second storage device controller with respective ones of the storage devices assigned to the first storage device controller, and respective other ones of the storage devices assigned to the second storage device controller. During normal run-time, each storage device controller validates cached write data after it is written to its cache memory by reading the write data from its cache memory. If any error is detected on the read, then unit check failed storage device controller, which results in a reset of the failed storage device controller. Responsive to the failed first storage device controller, the surviving second storage device controller tests a cache mirrored copy from its cache memory of the failed first storage device controller before takes ownership of all storage devices.

In accordance with features of the invention, cache data writes of the first storage device controller are mirrored to the cache memory of the second storage device controller. Validation of cached write data by reading the write data from cache memory can be part of the operation that mirrors the data into the cache memory on a partner storage device controller.

Errors detected by normal run-time reads or for test reads following loss of partner controller include, for example, one or more of Uncorrectable Error Correction Code (ECC) errors; decompression errors, Cyclical Redundancy Check (CRC) or T10 differential errors, and any hardware fault from the memory controller.

In accordance with features of the invention, host read/write operations are queued for storage devices the surviving controller already owns, before testing the cache mirrored copy.

In accordance with features of the invention, when no errors are detected from testing the cache mirrored copy, the metadata on all storage devices are updated indicating the cache memory of the failed first storage device controller is out of synchronization, and read/write operations are serviced for storage devices the surviving controller already owns.

In accordance with features of the invention, read/write operations from the host system for all devices are serviced after the surviving storage device controller takes ownership of all storage devices. Cache memory is flushed to the storage devices. The cache memory is bypassed for new write ops until the surviving storage device controller is re-mirrored with a partner controller.

In accordance with features of the invention, the risk is reduced of one controller taking ownership of storage devices by putting storage devices out of sync for the other controller, and then failing to destage its cache contents to the storage devices due to memory errors in its cache memory. This benefit is realized for both the owned part of cache memory and this controller's mirrored copy of the other controller's cache memory In accordance with features of the invention, when a storage device controller detects its dual controller partner fails, the surviving storage device controller does not fail host read/write operations for storage devices already owned. The surviving storage device controller does not request a reset from the host system. The surviving storage device controller queues the host read/write operations and does not give status to the host for those ops at this time.

In accordance with features of the invention, the surviving storage device controller testing of the cache mirrored copy from its cache memory of the failed first storage device controller before takes ownership of all storage devices includes checking of the error detection mechanisms that are used when the data is read from cache memory for writing to the storage devices or during destage from cache operation.

In accordance with features of the invention, if any errors are detected in the testing of the cache mirrored copy then the takeover of the other controller's storage devices is not attempted. Both storage device controllers are reset. The usual power on reset sequence is attempted for both storage device controllers. Both storage device controllers do their normal power-on self test. If one storage device controller has errors in its write cache, it does not attempt to own devices. The storage device controller that passes its power-on self test owns all storage devices and flushes its cache to the storage devices.

In accordance with features of the invention, if no errors are detected in testing the cache mirrored copy or redundant copy of the failed controller's cache, then the takeover of the storage devices of other failed storage device controller and cache data continues.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing enhanced data caching and takeover of non-owned storage devices in dual storage device controller configuration with data in write cache.

Figure 1:
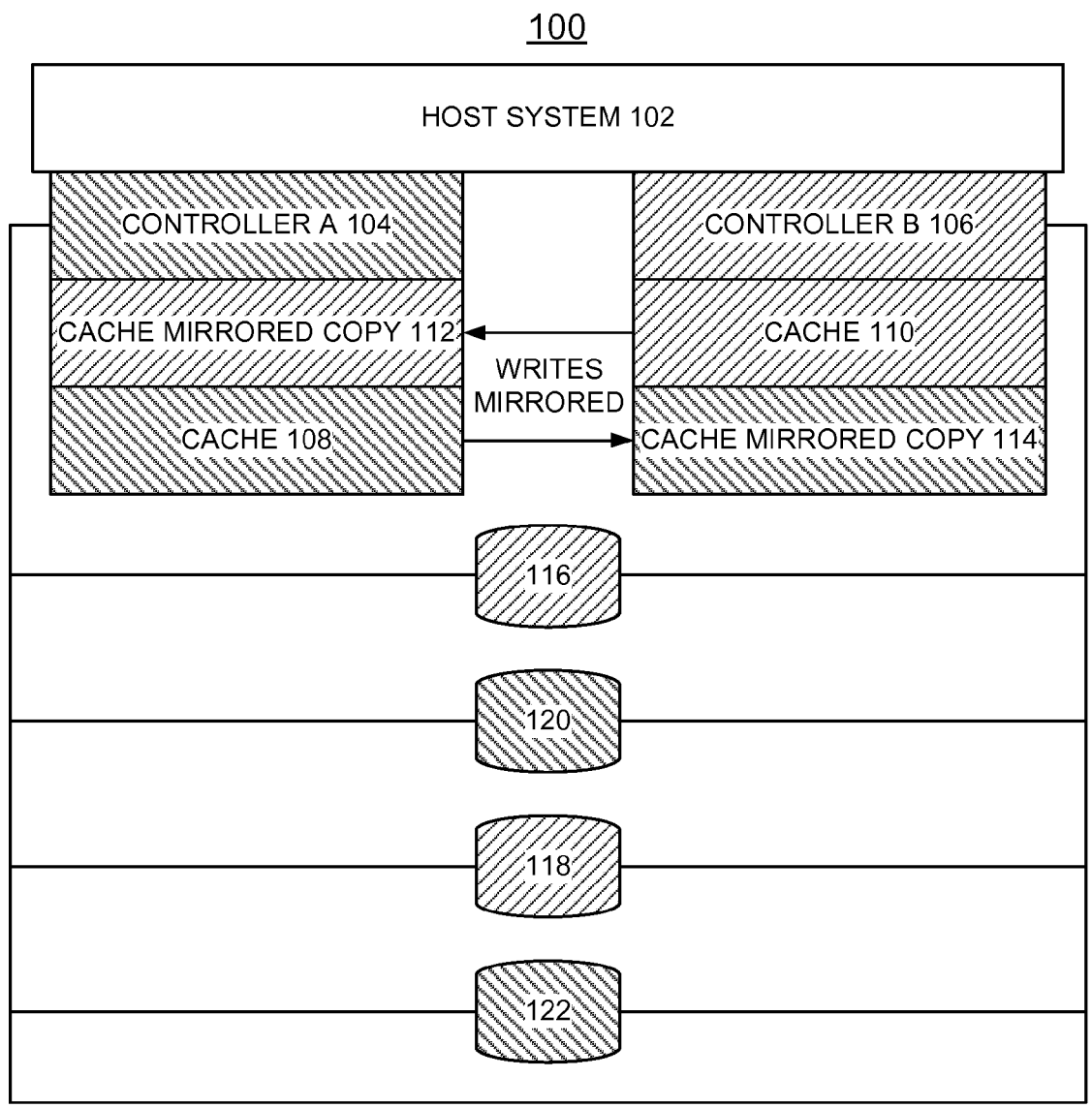
FIG. 1 illustrates an example computer system for implementing takeover of non-owned storage devices in dual storage device controller configuration with data in write cache in accordance with the preferred embodiment.

Having reference now to the drawings, in FIG. 1, there is shown an example computer system generally designated by the reference character 100 for implementing enhanced data caching and takeover of non-owned storage devices in dual storage device controller configuration with data in write cache in accordance with the preferred embodiment. Computer system 100 includes a host system 102, and a first storage device controller A 104 and a second storage device controller B 106. The first storage device controller A 104 has a cache memory 108 and the second storage device controller B 106 has a cache memory 110. The first storage device controller A 104 stores a cache mirrored copy 112 in its cache memory 108 from cache write data of the second storage device controller B 106, and writes a cache mirrored copy 114 in the cache memory 110 of its cache write data.

Computer system 100 includes a plurality of storage devices 116, 118, 120, 122 connected to both the first storage device controller A 104 and second storage device controller B 106. As indicated by common cross-hatch lines in the controllers 104, 106 and storage devices 116, 118, 120, 122, respective ones of the storage devices 116, 118 are assigned to the first storage device controller A 104, and respective other ones of the storage devices 120, 122 are assigned to the second storage device controller B 106.

In accordance with features of the invention, as illustrated during normal run-time of system 100 as shown in FIG. 1, each storage device controller A 104, storage device controller B 106 validates cached write data after the storage device controller puts the data in its cache memory 108, 110 by reading the write data from its cache memory 108, 110. If any error is detected on the read, then a unit check is provided for a failed storage device controller A 104, or storage device controller B 106, which results in a reset of the failed storage device controller by the host system 102. Unit checking when a cache mirrored write to the other storage device controller fails due to a read DMA error prevents operation with corrupt data in the owned cache. This protects the owned cache data on each controller A 104, controller B 106.

Computer system 100 is shown in simplified form sufficient for understanding the present invention. The illustrated computer system 100 is not intended to imply architectural or functional limitations. The present invention can be used with various hardware implementations and systems and various other internal hardware devices.

Referring also to FIGS. 2, 3, 4, and 5, there are shown exemplary operations for implementing enhanced data caching and takeover of non-owned storage devices in dual storage device controller configuration of system 100 with data in write cache in accordance with the preferred embodiment.

Figure 2:
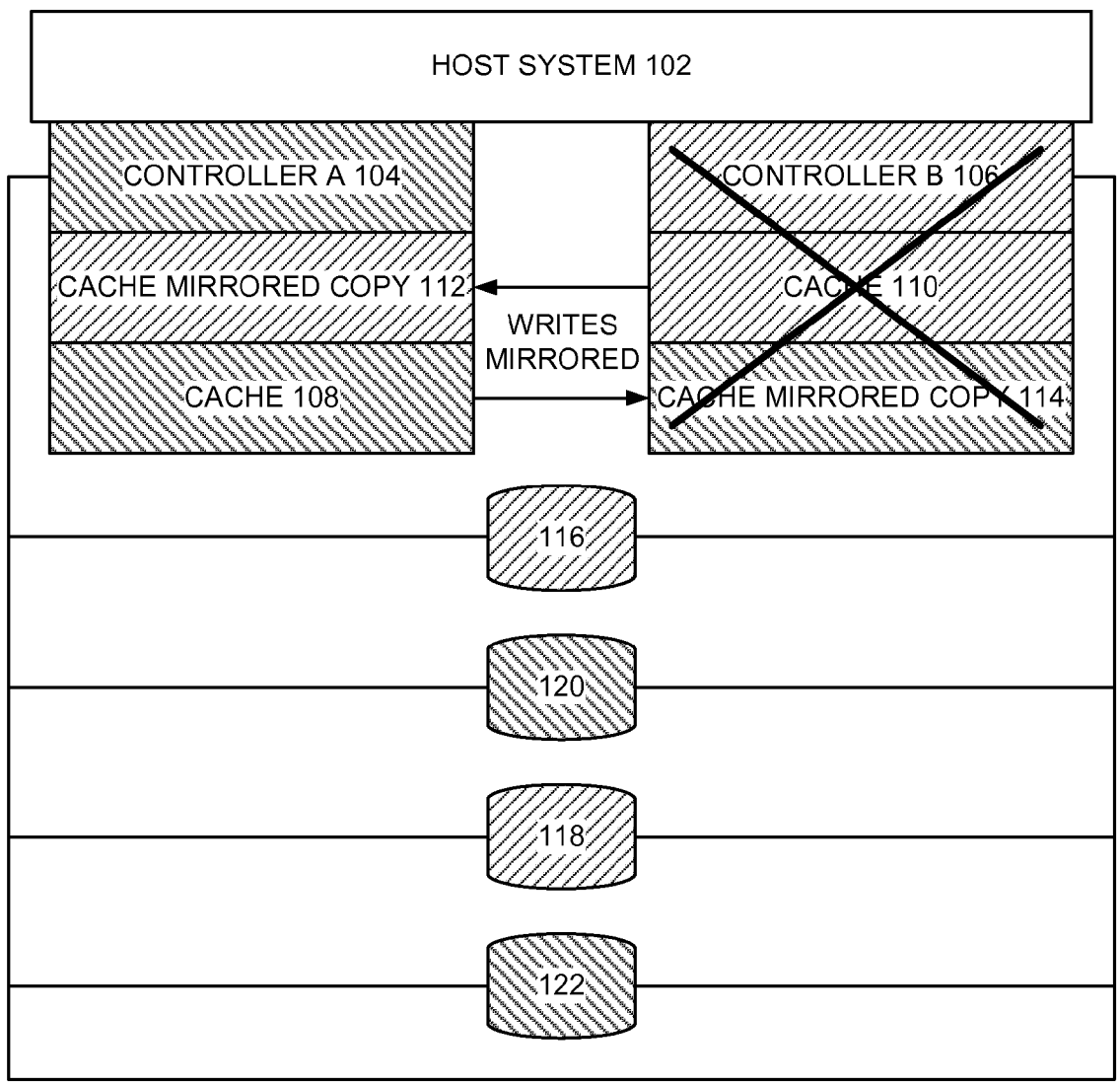
FIGS. 2, 3, 4, and 5 together illustrate exemplary operations for implementing takeover of non-owned storage devices in dual storage device controller configuration with data in write cache in accordance with the preferred embodiment.
Figure 3:
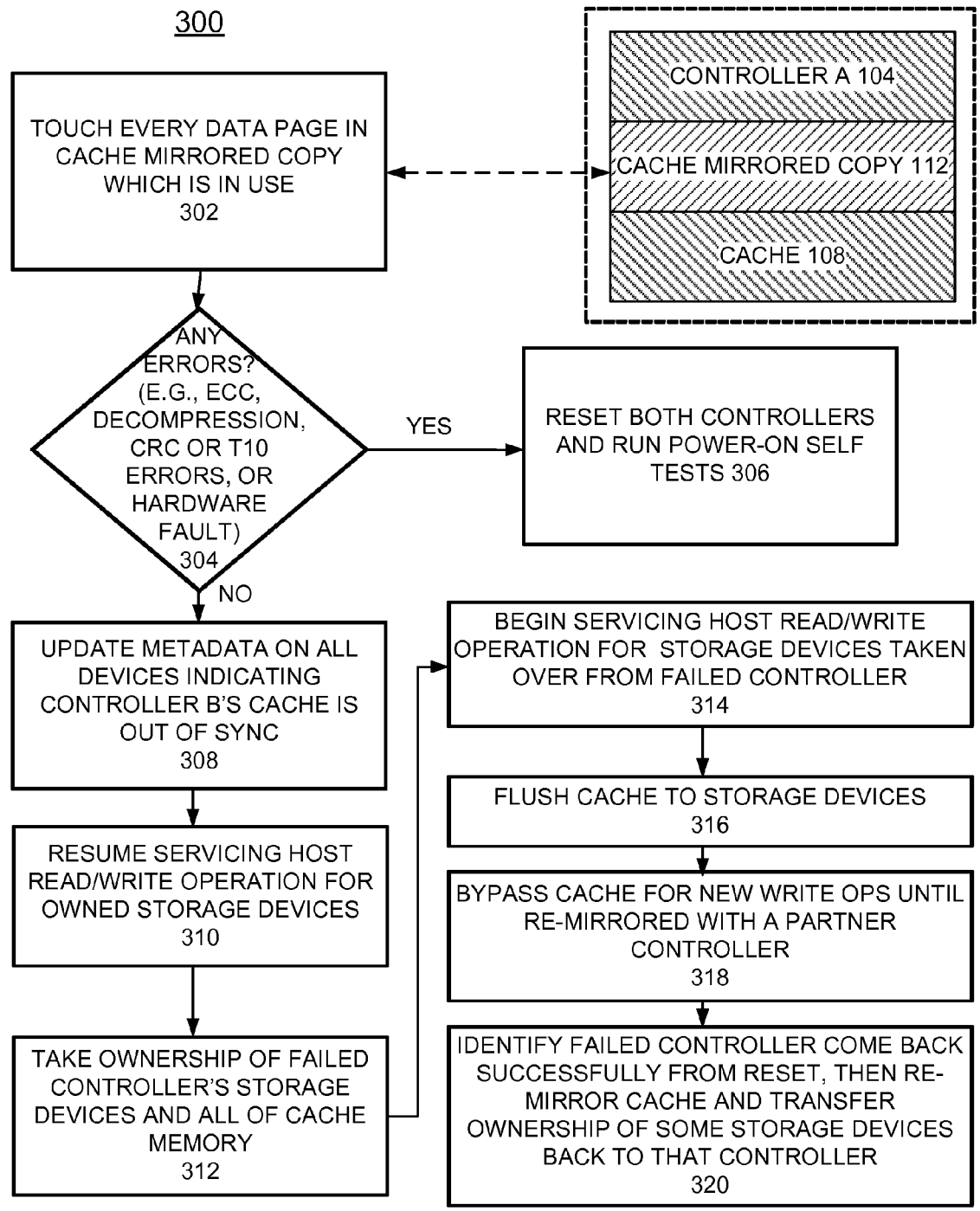

In accordance with features of the invention, for example, as illustrated in FIG. 2, when the second storage device controller B 106 fails for any reason, the surviving first storage device controller A 104 tests a cache mirrored copy 112 from its cache memory 108 of the failed first storage device controller B 106 before takes ownership of all storage devices as shown in FIG. 3. The surviving first storage device controller A 104 does not fail host read/write operations for storage devices 116, 118 already owned. The surviving first storage device controller A 104 does not request a reset from the host system 102. The surviving first storage device controller A 104 queues the host read/write operations and does not give status to the host system 102 for those ops at this time.

In FIG. 3, as indicated in a block 302, the surviving controller A 104 tests the redundant copy or cache mirrored copy 112 in its cache 108 of the failed controller's cache. For this test, the surviving controller A 104 reads the cache mirrored copy 112 from the cache memory 108. The surviving controller A 104 checks all DMA error detection mechanisms that would be used when the data is read from cache memory 108 for writing to the storage devices 116, 118 during destage from cache operation.

Checking for any errors is performed as indicated in a decision block 304, include errors detected by normal runtime reads or for test reads following loss of partner controller including, for example, one or more of Uncorrectable Error Correction Code (ECC) errors; decompression errors, Cyclical Redundancy Check (CRC) or T10 differential errors, and any hardware fault from the memory controller.

In accordance with features of the invention, by doing the pretest at decision block 304 and not updating the metadata on storage devices 116, 118, 120, 122 if the pretest fails at decision block 304 avoids having put the other controller's cache out of sync. In that scenario if the failed controller comes back successfully after both controllers 104, 106 are reset, its cache 110 will still be in sync with the metadata on the storage devices 120, 122. When the failed controller B 106 comes back successfully, the failed controller B 106 can flush its cache data to the storage devices 120, 122. Even though the surviving controller's cache memory failed, the data was not lost since the original failed controller B 106 was recovered by reset and still had a good copy of the cache data that was still in sync with the metadata on the storage devices. This protects the non-owned cache data on each controller A 104, controller B 106.

Figure 5:
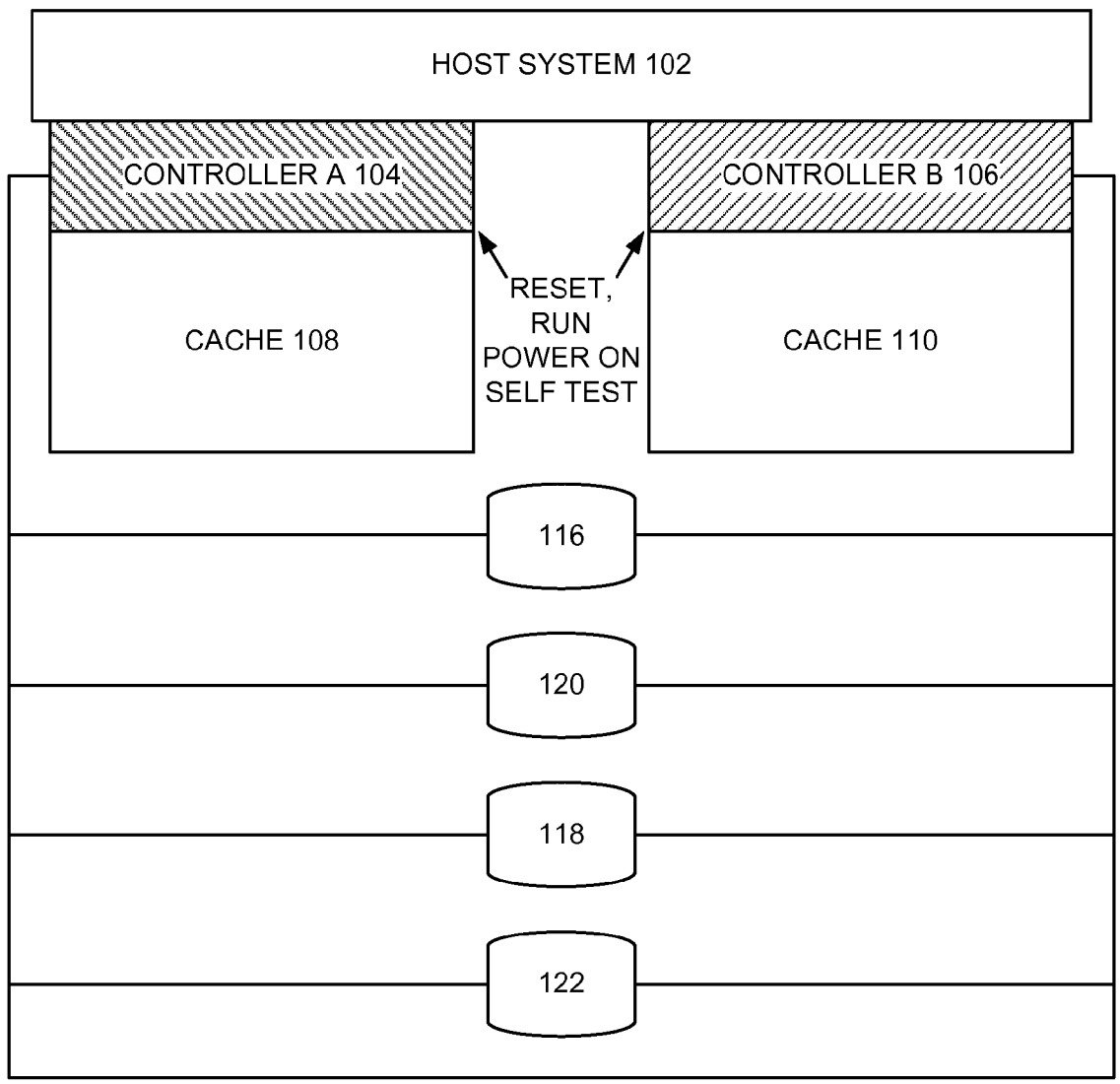

If any errors are detected at block 304, then both controllers are reset and power-on self tests are run as indicated in a block 306 as shown in FIG. 5. If any errors are detected at block 304, then takeover of the other controller's storage devices is not attempted. The usual power on reset sequence is attempted for both controllers 104, 106 at block 306. Both controller A 104, and controller B 106 do their normal power-on self test. If one controller A 104 or controller B 106 has errors in its write cache, the failed controller does not attempt to own storage devices. The surviving controller A 104 or, controller B 106 that passes its power-on self test owns all devices 116, 118, 120, 122 and flushes its cache 108, or 110 to the storage devices.

Figure 4:
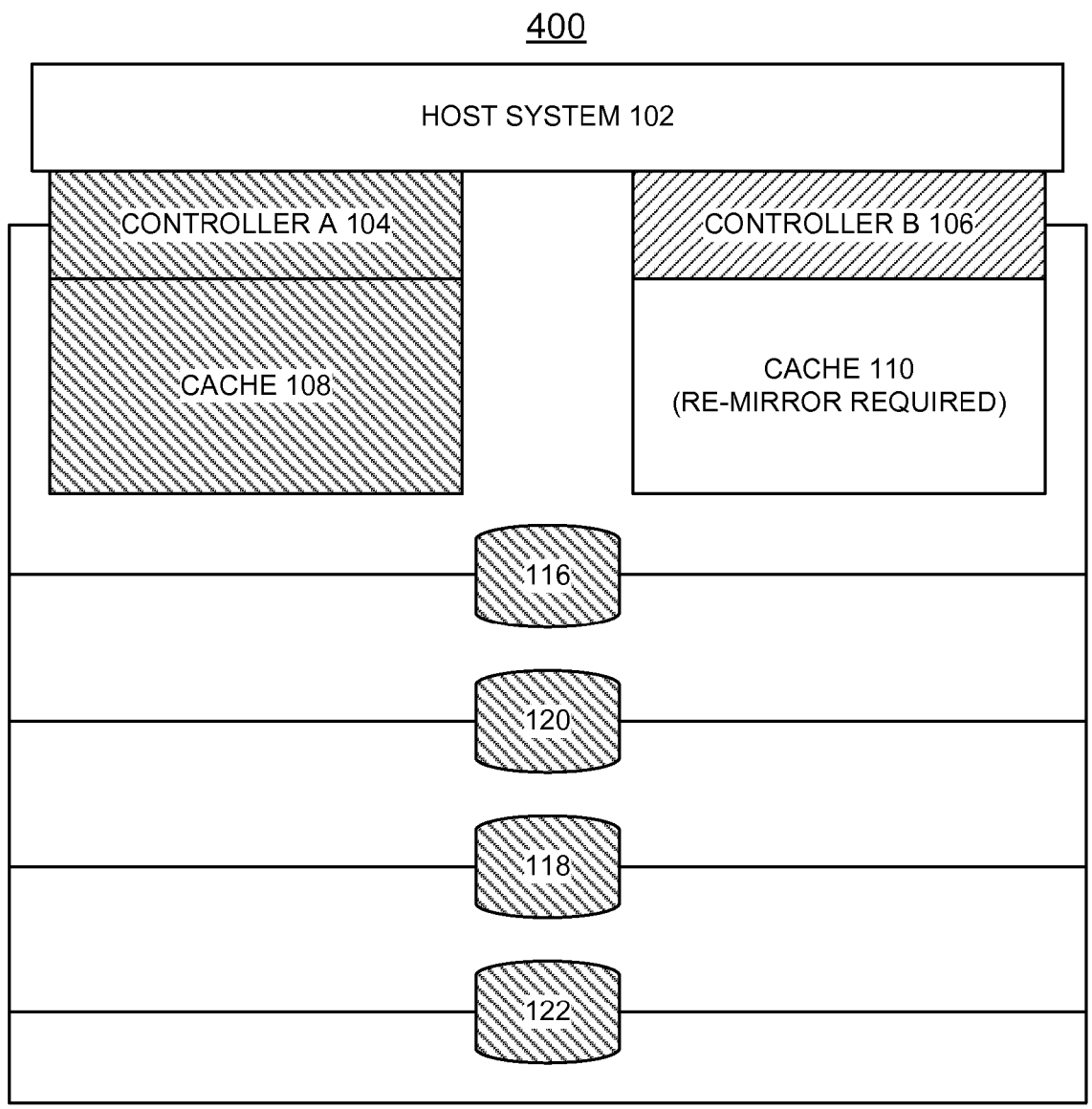

If no errors are detected at block 304 in testing the redundant copy 112 of the failed controller's cache 110, then the takeover of the other failed controller's storage devices 120, 122 and cache data continues as shown in FIG. 4.

Steps for takeover include first host read/write operations are queued for storage devices the surviving controller already owns, before testing the cache mirrored copy at blocks 302 and 304.

When no errors are detected from testing at block 304 of the cache mirrored copy, as indicated in a block 308 the metadata on all storage devices are updated indicating the cache memory 110 of the failed storage device controller B 106 is out of synchronization, and read/write operations are serviced for storage devices the surviving controller already owns as indicated in a block 310. The surviving controller takes ownership of the failed controller's storage devices 120, 122 and all of cache memory as indicated in a block 312.

As indicated in a block 314 read/write operations from the host system for all devices are serviced after the surviving storage device controller takes ownership of all storage devices. Cache memory 108 is flushed to the storage devices 116, 118, 120, 122 as indicated in a block 316. The cache memory 108 is bypassed for new write ops as indicated in a block 318 until the surviving storage device controller A 104 is re-mirrored with a partner controller.

As indicated in a block 320, watching for the failed controller to come back successfully from being reset. If the failed controller does come back successfully from being reset, then re-minor cache and transfer ownership of some storage devices back to that controller is performed at block 320, and as illustrated in FIG. 4.

If the failed controller comes back successfully from its reset as illustrated in FIG. 5, it will see the updated metadata on the storage devices 120, 122 and know its cache 110 is stale. It then discards its cache and re-mirrors its cache with the other controller as illustrated in FIG. 4. Ownership of devices 116, 118, 120, 122 is then partitioned between the two mirrored controllers 104, 106, for example, as shown in FIG. 1.

Figure 6:
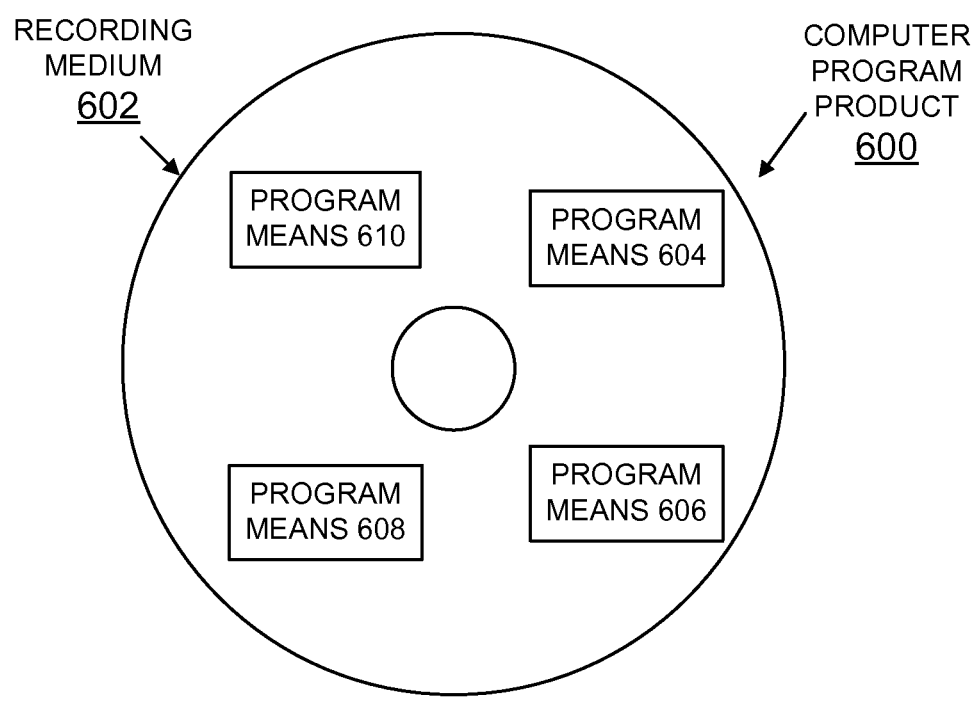
FIG. 6 is a block diagram illustrating a computer program product in accordance with the preferred embodiment.

Referring now to FIG. 6, an article of manufacture or a computer program product 600 of the invention is illustrated. The computer program product 600 is tangibly embodied on a non-transitory computer readable storage medium that includes a recording medium 602, such as, a floppy disk, a high capacity read only memory in the form of an optically read compact disk or CD-ROM, a tape, or another similar computer program product. Recording medium 602 stores program means 604, 606, 608, and 610 on the medium 602 for carrying out the methods for implementing takeover of non-owned storage devices in dual storage device controller configuration with data in write cache of the preferred embodiment in the system 100 of FIG. 1.

A sequence of program instructions or a logical assembly of one or more interrelated modules defined by the recorded program means 604, 606, 608, and 610, direct the computer system 100 for implementing enhanced write caching and takeover of non-owned storage devices in dual storage device controller configuration with data in write cache of the preferred embodiment.

While the present invention has been described with reference to the details of the embodiments of the invention shown in the drawing, these details are not intended to limit the scope of the invention as claimed in the appended claims.

What is claimed is:

1. A method for implementing enhanced data caching and takeover of non-owned storage devices in a computer system comprising:

providing each of a first storage device controller and a second storage device controller with a cache memory;
connecting a plurality of storage devices to the first storage device controller and second storage device controller, and assigning respective ones of the storage devices assigned to the first storage device controller, and respective other ones of the storage devices assigned to the second storage device controller;

during normal run-time, each storage device controller performing the steps of:

writing data to its cache memory and writing a cached mirrored copy in the cache memory of the other storage device controller, and storing a cached mirrored copy in its cache memory from cached write data of the other storage device controller;

validating cached write data after writing data to its cache memory by reading the write data from its cache memory;

responsive to detecting any error on the read, marking the storage device controller as failed and reset the failed storage device controller;

responsive to the failing of a storage device controller, a surviving storage device controller performing the steps of:

queuing host read/write operations for storage devices assigned to the surviving storage device controller; and testing from the surviving storage device controller's cache memory cached mirrored copy of the failed storage device controller's cache before taking ownership of all storage devices.

2. The method as recited in claim 1 includes the surviving storage device controller performing the steps responsive to no errors being detected in cache mirrored copy, updating metadata on all storage devices indicating the cache memory of the failed storage device controller being out of synchronization.

3. The method as recited in claim 2 includes resume servicing of host read/write operations for storage devices assigned to the surviving storage device controller.

4. The method as recited in claim 2 includes taking ownership of all storage devices.

5. The method as recited in claim 4 includes begin servicing of host read/write operations for storage devices taken over from the failed storage device controller.

6. The method as recited in claim 5 includes flushing of cache to storage devices.

7. The method as recited in claim 6 includes bypassing cache memory for new write ops until the surviving storage device controller is re-mirrored with a partner controller.

8. The method as recited in claim 1 wherein during normal run-time, each storage device controller performing the steps of mirroring cache data writes to the cache memory of the other storage device controller.

9. The method as recited in claim 8 wherein validating of cached write data includes reading the write data from cache memory as part of the mirrors operation into the cache memory on a partner storage device controller.

10. The method as recited in claim 1 includes the surviving storage device controller responsive to errors being detected in cache mirrored copy performing the steps of resetting both the surviving storage device controller and the failed storage device controller and performing self power on reset.

11. The method as recited in claim 1 wherein error detecting both during normal run-time reads and for test reads responsive to a storage device controller fails include testing for one or more of Uncorrectable Error Correction Code (ECC) errors; decompression errors, Cyclical Redundancy Check (CRC) errors and T10 differential errors, and any hardware fault of the storage device controller.

12. A system for implementing enhanced data caching and takeover of non-owned storage devices in a computer system comprising:

a first storage device controller having a cache memory;
a second storage device controller having a cache memory;
a plurality of storage devices connected to the first storage device controller and second storage device controller, respective ones of the storage devices assigned to the first storage device controller, and respective other ones of the storage devices assigned to the second storage device controller;

during normal run-time, each storage device controller performing the steps of:

writing data to its cache memory and writing a cached mirrored copy in the cache memory of the other storage device controller, and storing a cached mirrored copy in its cache memory from cached write data of the other storage device controller; validating cached write data after writing data to its cache memory by reading the write data from its cache memory;

responsive to detecting any error on the cached write data read, marking the storage device controller as failed and resetting the failed storage device controller;

responsive to the failing of a storage device controller, a surviving storage device controller performing the steps of:

queuing host read/write operations for storage devices assigned to the surviving storage device controller; and testing from the surviving storage device controller's cache memory cached mirrored copy of the failed storage device controller's cache before taking ownership of all storage devices.

13. The system as recited in claim 12 wherein error detecting both during normal run-time reads and for test reads responsive to a storage device controller fails include testing for one or more of uncorrectable Error Correction Code (ECC) errors;

decompression errors, Cyclical Redundancy Check (CRC) errors and T10 differential errors, and any hardware fault of the storage device controller.

14. The system as recited in claim 12 includes the surviving storage device controller performing the steps responsive to no errors being detected in cache mirrored copy, updating metadata on all storage devices indicating the cache memory of the failed storage device controller being out of synchronization.

15. The system as recited in claim 14 includes resume servicing of host read/write operations for storage devices assigned to the surviving storage device controller.

16. The system as recited in claim 14 includes taking ownership of all storage devices.

17. The system as recited in claim 16 includes begin servicing of host read/write operations for storage devices taken over from the failed storage device controller.

18. The system as recited in claim 17 includes flushing of cache to storage devices.

19. The system as recited in claim 18 includes bypassing cache memory for new write ops until the surviving storage device controller is re-mirrored with a partner controller.

20. The system as recited in claim 12 includes the surviving storage device controller responsive to errors being detected in cache mirrored copy performing the steps of resetting both the surviving storage device controller and the failed storage device controller and performing self power on reset.

* * * * *